(12) United States Patent
Truax

(10) Patent No.: US 7,491,929 B2
(45) Date of Patent: Feb. 17, 2009

(54) METHOD AND RELATED SYSTEM OF PULSED NEUTRON LOGGING

(75) Inventor: Jerome Truax, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 247 days.

(21) Appl. No.: 11/380,963

(22) Filed: May 1, 2006

(65) Prior Publication Data
US 2007/0252080 A1 Nov. 1, 2007

(51) Int. Cl.
*G01V 5/10* (2006.01)
(52) U.S. Cl. .................................. 250/269.6
(58) Field of Classification Search ............... 250/269.6, 250/269.2, 269.4, 269.7, 269.8, 265, 266
See application file for complete search history.

(56) References Cited

U.S. PATENT DOCUMENTS 4,475,038 A * 10/1984 Lochmann et al. ....... 250/269.6
5,900,627 A    5/1999 Odom et al.
6,207,953 B1 * 3/2001 Wilson .................... 250/269.4
2005/0028586 A1 * 2/2005 Smits et al. .............. 73/152.14
2005/0173153 A1 * 8/2005 Alft et al. ..................... 175/46

* cited by examiner

*Primary Examiner*—David P Porta
*Assistant Examiner*—Kiho Kim
(74) *Attorney, Agent, or Firm*—Mark E. Scott; Conley Rose, P.C.

(57) ABSTRACT

A method and related system of pulsed-neutron logging. At least some of the illustrative embodiments are a method comprising releasing neutrons from a neutron source of a logging tool within a borehole, detecting gamma rays by a sensor on the logging tool (the gamma rays produced by capture of at least some of the neutrons, and wherein the detecting produces sensed gamma rays), determining from the sensed gamma rays a point in time at which gamma rays produced within the borehole reach a predetermined threshold, and using the sensed gamma rays detected after the point in time to determine a parameter of a formation surrounding the borehole.

20 Claims, 3 Drawing Sheets

METHOD AND RELATED SYSTEM OF PULSED NEUTRON LOGGING

CROSS-REFERENCE TO RELATED APPLICATIONS

None.

STATEMENT REGARDING FEDERALLY SPONSORED RESEARCH OR DEVELOPMENT

Not applicable.

BACKGROUND

1. Field of the Invention

Embodiments of the invention are directed to logging tools. More particularly, embodiments of the invention are directed to pulsed-neutron logging tools, possibly used to determine formation lithology and/or macroscopic capture cross-section.

2. Background

Pulsed-neutron logging tools may be used in uncased boreholes, cased boreholes, and production tubing of a cased borehole. Pulsed-neutron logging tools operate by releasing high energy neutrons, on the order of 14 Million electron Volts (MeV), into the borehole and formation. The neutrons create gamma particles or gamma rays by one of several of reactions: 1) the neutrons inelastically collide with atomic nuclei and thereby create gamma rays (known as inelastic gamma rays); and 2) when a neutron loses energy (possible through the inelastic collisions or by other means) the neutron is captured by a nearby atom and in the process a gamma ray is emitted (known as a capture gamma ray). When enough gamma rays are observed to obtain a statistically significant distribution, inelastic gamma rays and capture gamma rays and their element of provenance can be distinguished by their energy.

When using a pulsed-neutron logging tool as a bulk density measurement device, inelastic gamma rays carry most of the information as to the formation bulk density. When using a pulsed-neutron tool to determine formation lithology or the macroscopic capture cross-section, it is often the capture gamma rays that carry most of the information. However, elements of the various components that are in, or which form, the borehole (e.g., drilling fluid, casing, cement, production tubing, and the logging tool itself) also capture neutrons, and thus it is difficult in the related art to distinguish capture gamma rays originating within the borehole from those originating within the formation.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or mechanical connection, as the context may require. Thus, if a first device couples to a second device, that connection may be through a direct connection, or through an indirect connection via other devices and connections.

DETAILED DESCRIPTION

Figure 1:
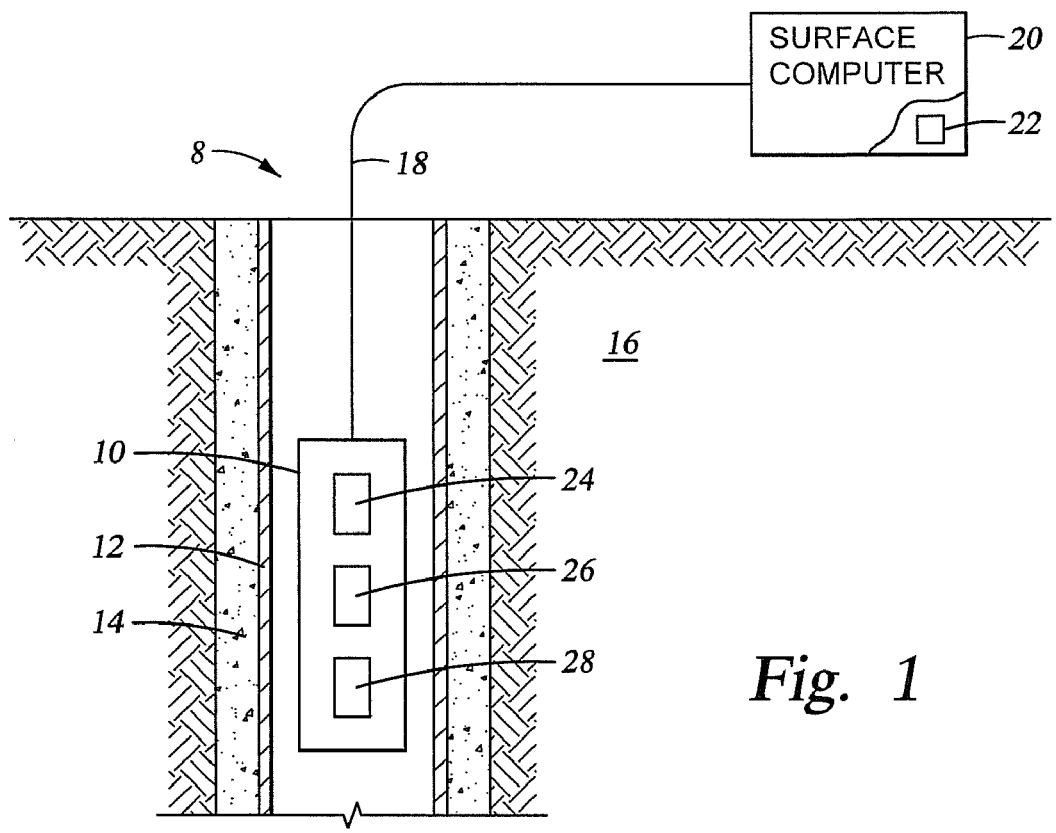
FIG. 1 illustrates a logging system constructed in accordance with embodiments of the invention.

FIG. 1 illustrates a logging system constructed in accordance with at least some embodiments of the invention. In particular, a logging tool 8 comprises a sonde or tool body 10 which is placed within a well casing 12 of a borehole. The well casing 12 may have cement 14 between its outer diameter and the formation 16, and the borehole may be referred to as a cased borehole. In these embodiments the tool body 10 may be suspended within the borehole by cable 18. The cable 18 not only provides support for the tool body 10, but also couples the logging tool 8 to a surface computer 20, an in particular a processor 22. The tool body 10 may be raised and lowered within the borehole by way of the cable 18.

In accordance with at least some embodiments of the invention, the logging tool 8 comprises a neutron source 24 mounted to and/or within the tool body 10. The neutron source 24 produces and/or releases high energy neutrons. For example, the neutron source 24 releases neutrons having energies of approximately 14 MeV (e.g., from a deuterium/tritium neutron generator) or 2.5 MeV (e.g., from a deuterium/deuterium neutron generator). The neutron source 24 may be capable of producing neutrons in a pulsed fashion, possibly on command from the processor 22 of the surface computer 20. Any neutron source producing and/or releasing neutrons with sufficient energy and having a requisite size may be used. The logging tool 8 may also comprise detectors 26, 28 mounted to and/or within the sonde 10. As illustrated, detector 26 may be relatively close to the neutron source 24, and therefore is referred to as the "near detector." Likewise, detector 28 may be spaced away from the source 24, and therefore is referred to as the "far detector." In alternative embodiments, the neutron source 24 is below the detectors. In accordance with at least some embodiments of the invention, the near detector 26 may be approximately one foot from the source 24, and the far detector 28 may be approximately two to three feet from the source 24. While two gamma ray detectors 26 and 28 are illustrated, in embodiments where the neutron source can control or count the number of neutrons released, any number of gamma ray detectors may be used (e.g., one or more). Stated otherwise, use of two or more gamma ray detectors allows calculations of formation parameters to be made substantially independent of the number of neutrons released.

Neutron source 24 generates and/or releases neutrons having high energy, and the neutrons interact with particles of structures forming the borehole (e.g., drilling fluid within the borehole, the casing 12, cement 14, and even the tool body 10 itself) to produce gamma rays having varying energies. Likewise, the neutrons interact with particles of the formation 16 to produce gamma rays having varying energies. Detectors 26 and 28 are preferably scintillation detectors capable of detecting the presence of gamma rays, and also detecting energy of received gamma rays. Any suitable scintillation detector may be used. Tool body 10, neutron source 24 and detectors 26, 28 may thus form the pulsed-neutron logging tool 8.

Figure 2:
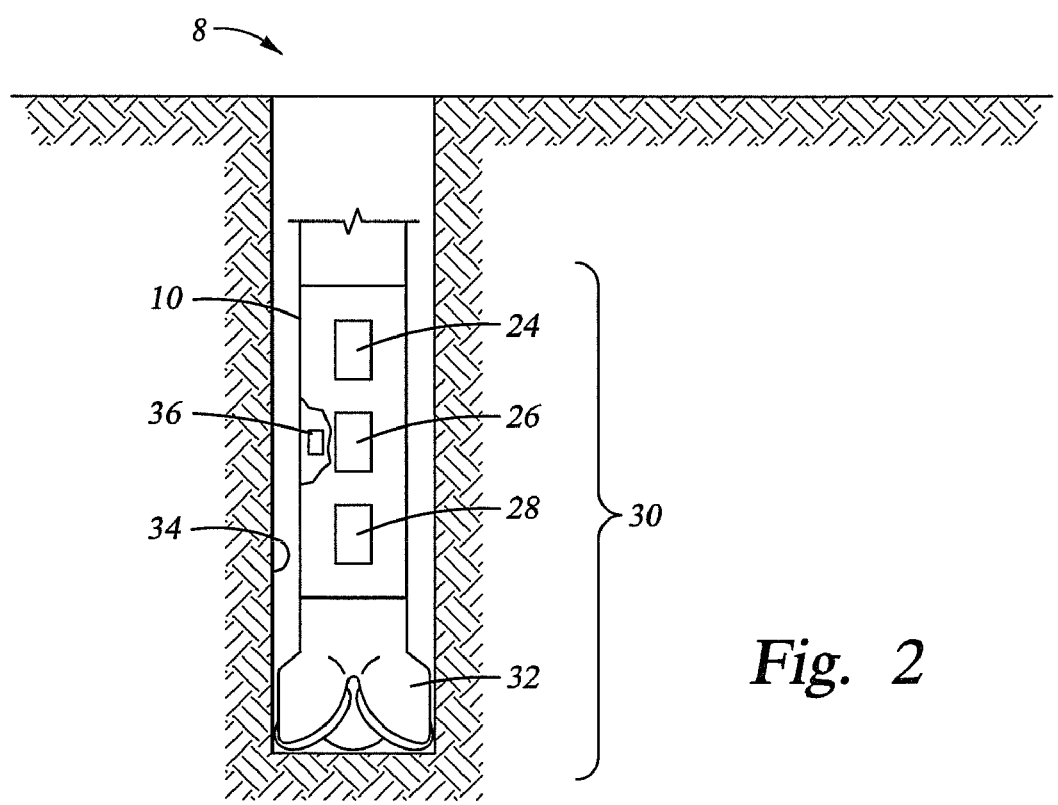
FIG. 2 illustrates a logging system constructed in accordance with alternative embodiments of the invention.

Referring to FIG. 2, tie tool body 10 may alternatively be a tool body suitable for operation in a logging-while-drilling (LWD) environment. In these embodiments, the bottomhole assembly 30 may comprise a drill bit 32, the pulsed-neutron logging tool 8, and other devices (e.g., other types of LWD tools, and systems designed to communicate with surface devices (possibly using drilling fluid within the drill string as the communication medium)). Thus, in these embodiments the logging tool 8 is used in an uncased borehole 34. Processor 36, coupled within the tool body 10, controls the logging tool 8 and may also perform the calculations described herein.

As alluded to in the Background section, high energy neutrons create gamma rays by a plurality of interactions. Inelastic collision of the neutrons with other particles creates gamma rays (inelastic gamma rays) whose energy is dependent upon the energy of the neutron at the time of the collision. Information regarding the formation can be gleaned from inelastic gamma rays, such as formation bulk density, carbon-to-oxygen ratio, and lithology. However, in accordance with embodiments of the invention it is the gamma rays associate with capture events that are of interest.

The second mechanism for creation of gamma rays is neutron capture. As a neutron moves through the formation and interacts with various particles (e.g., inelastic collisions), it loses energy until it reaches a low energy, below approximately 2.5 MeV. Although there may be some capture at higher energies, statistically spealing most capture events occur below 2.5 MeV. When a neutron is absorbed or captured by a nearby atom, the absorption process releases a gamma ray (the capture gamma ray). Some, but not necessarily all, of the capture gamma rays find their way back to one of the detectors 26 or 28. The energy of a capture gamma ray is dependent to a great extent on the type of atom which captured the neutron.

Using the knowledge that the energy of capture gamma rays is indicative of the atom which captured the neutron, the various embodiments of the invention may determine lithology of the formation. However, atoms of devices and fluids in the borehole also capture neutrons and produce capture gamma rays. Thus, prior to calculating a formation parameter, embodiments of the invention determine a point in time relative to the neutron pulse at which arrival of capture gamma rays from borehole resident atoms ceases or substantially ceases. Thus, substantially only capture gamma rays produced by interaction of neutrons with formation atoms are used to calculate formation parameters. To describe the technique of determining when capture gamma rays are substantially only from interactions of neutrons and atoms of the formation, reference is made to FIG. 3.

Figure 3:
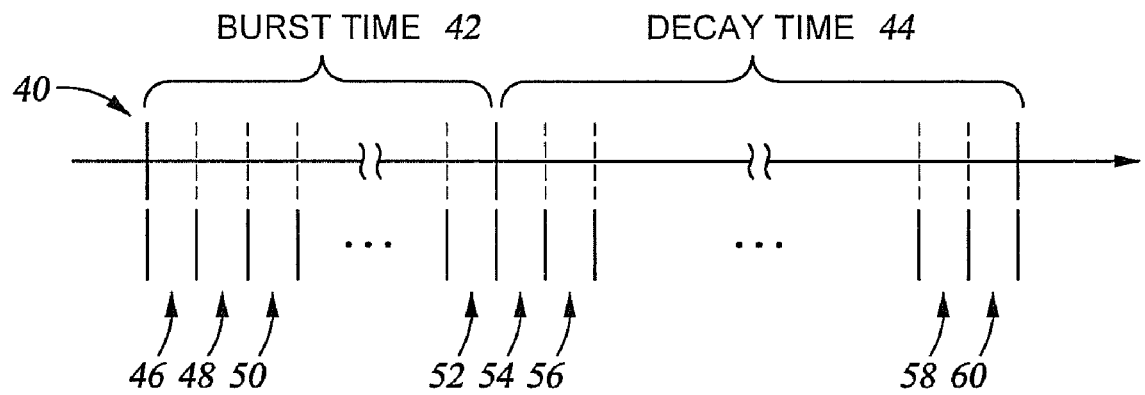
FIG. 3 illustrates a time line of events for pulsed-neutron logging in accordance with embodiments of the invention.

FIG. 3 illustrates a time line of events for pulsed-neutron logging in accordance with embodiments of the invention. In particular, at a time arbitrarily assigned as time zero 40, the processor (22, 36) associated with the neutron source 26 commands the neutron source 26 to begin generating and/or releasing high energy neutrons. Generation and/or release of high energy neutrons occurs for a predetermined period of time, known as the burst time 42. In accordance with at least some embodiments, the burst time may be on the order of 50 micro-seconds. After the burst time 42 is the decay time 44, which in accordance with at least some embodiments may be on the order of a milli-second. In some cases a new burst time immediately follows a decay time. Capture gamma rays may be produced during either the burst time 42 or the decay time 44; however, many of the capture gamma rays produced during the burst time 42, and for some time after the end of the bust time 42, are produced by capture of neutrons by atoms within the borehole.

Distinguishing borehole-sourced capture gamma rays and formation-sourced capture gamma rays in accordance with embodiments of the invention involves, in part, dividing the time spectrum of the burst and decay times into a plurality of bins. For example, bin 46 is allotted from time zero 40 to a predetermined time, such that the bin has a particular time width. Likewise, bins 48, 50 and 52 each have a substantially similar time width, and reside within the burst time 42. The decay time 44 too is divided into a plurality of time bins, for example bins 54, 56, 58 and 60. In accordance with at least some embodiments, there may be 256 time bins between the start of a burst time 42 and the end of the decay time 44, although any number of times bins may be used.

A gamma ray detector (26, 28), possibly in combination with the processor (22, 36), is capable of distinguishing not only energy of gamma rays that find their way back to the detectors, but also arrival time. In accordance with embodiments of the invention, the processor (22, 36) considers gamma rays that arrive within a particular time bin to have arrived at the same time for further processing (though the actual arrival time data is not necessarily discarded, and in fact may be used with regard to determining macroscopic capture cross-section, as described below). Thus, within each time bin the gamma ray detector (26, 28) and the processor (22, 36) gather data about the energy of gamma rays received. During the burst time 42 and for an amount of time in the decay time 44 thereafter, the gamma ray detector (26, 28) also receives inelastic gamma rays. However, inelastic gamma rays and thermal capture gamma rays are distinguishable by energy, and so data regarding inelastic gamma rays are not considered. Within each time bin, the gamma ray detector (26, 28) and/or the processor (22, 36) record arrival time and energy of each capture gamma rays. From the data, the point in time at which capture gamma rays produced within the borehole substantially cease may be determined. It is noted that gamma ray production may never completely cease, as neutrons in the formation may find their way back to the borehole and be captured. Thus, the phrase "substantially ceases" as used herein, and in the claims, shall mean the point in time when gamma ray production falls below a statistically significant level.

Figure 4:
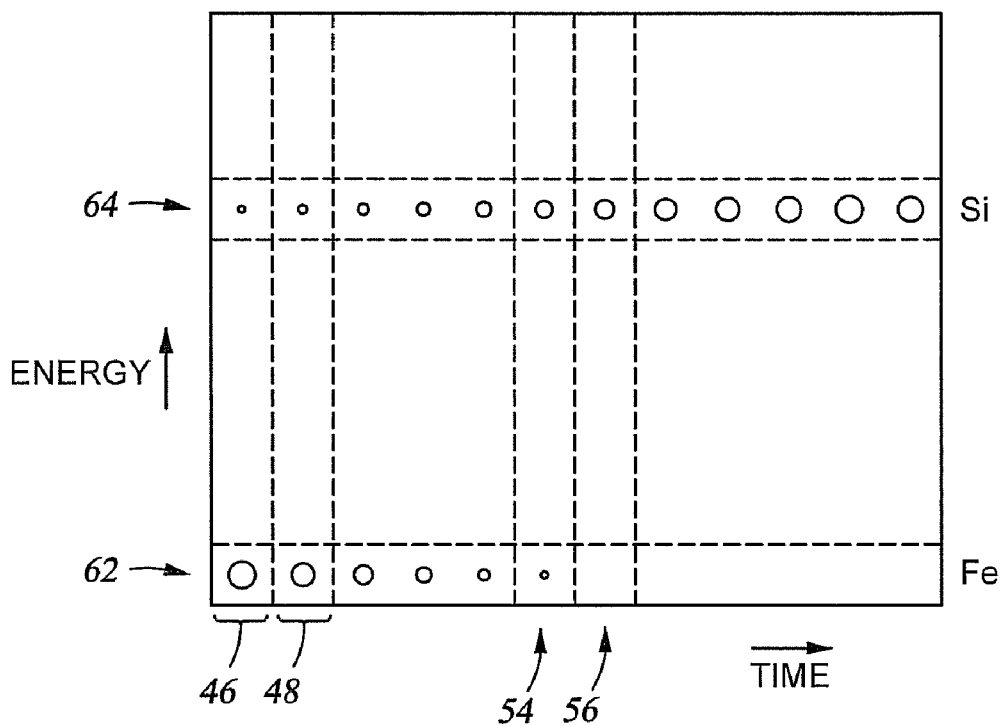
FIG. 4 illustrates a graph of response as a function of time and energy in accordance with embodiments of the invention.

Determining the point in time at which capture gamma rays produced within the borehole substantially stop may at least conceptually, though not necessarily actually, involve organizing the data from the bins in graph form. FIG. 4 illustrates just such a graph. In particular, FIG. 4 illustrates a graph having time as the abscissa and energy as the ordinate. Each time bin is allotted a portion of the abscissa, with the number of gamma rays received, and their respective energies, represented along the energy axis. For example, the energy data of time bins 46 and 48 (being just after the start of the burst time 42) are illustrated in FIG. 4, and within each illustrative time bin the number of gamma rays with a particular energy are illustrated by the size of the dot (smaller dot, fewer received gamma rays with that energy, and vice-versa). Likewise, the energy data of time bins 54 and 56 (being just after the start of the decay time 44) are illustrated in FIG. 4, and within each illustrative time bin the number of gamma rays with a particular energy are illustrated by the size of the dot. Once plotted, one may look at the progression of receipt of gamma rays of a particular energy as a function of time. FIG. 4 illustrates two such energies, one for iron 62, and the second for silicon 64.

Although there are many elements that make up the devices in the borehole, the most predominant element present in the borehole is iron (e.g., casing, production tubing, and/or tool body). By contrast, only in rare circumstances is iron present in the formation from which there has been hydrocarbon production, or from which hydrocarbon production is desired. In accordance with at least some embodiments, determining when the borehole contribution of produced capture gamma rays has substantially ceased involves analyzing the data to determine when the arrival of capture gamma rays produced by neutron capture by iron substantially ceases. The time at which the arrival of borehole-sourced capture gamma rays substantially ceases may be significantly different as between cased and uncased boreholes, from cased borehole to cased borehole, and from depth to depth in the same borehole. Thus, embodiments of the invention may determine an optimal point in time after which capture gamma ray data should be considered for determining formation parameters. In the illustrative graph of FIG. 4, arrival of capture gamma rays associated with iron have substantially ceased after time bin 54. It should be noted, however, that embodiments of the invention are not limited to using only iron as the indication of borehole contribution. Any other element too could be used if that element is present substantially only in the borehole and/or borehole equipment (e.g., iron, hydrogen, chlorine). Moreover, the response with respect to several elements could be used. Alternatively, there may be very little silicon in the borehole, and thus the determination of when the borehole contribution of produced gamma rays has substantially ceased may be made by considering when response with respect to elements found substantially only within the formation begin to arrive.

Once the point in time (or energy bin) at which the arrival of capture gamma rays produced within the borehole substantially stopped has been determined, the remaining data may be used to calculate formation parameters such as lithology and/or macroscopic capture cross-section. Each of these will be discussed in turn, starting with formation lithology.

While there are many known elements, there are relatively few elements that make up formations that are detectable by spectroscopy. The response of each of these elements individually during neutron capture is known, but it may be difficult to discern the response of a particular element when all that is known is a composite signal comprising responses of a plurality of elements. By assuming the formation under test has only a small number of the possible elements, and taking into account possible contributions of the known response of each of the small number of possible elements of the formation, one may estimate a lithography that is reasonably close to the actual formation lithography. However, if the composite signal also contains appreciable contributions from elements that are not assumed to be in the formation, like iron, then the solution formulated may not be reasonably close to the actual formation lithography. Conversely, if a broad-brush approach is used, and much of the data removed because of the mere possibility it is composed to some extent of borehole-sourced capture gamma ray data, the solution formulated may not be reasonably close to the actual formation lithography. In calculating formation lithography, some embodiments of the invention only utilize data regarding capture gamma rays after the point in time at which arrival of gamma rays produced within the borehole have substantially ceased. In this way, the detrimental effects of borehole-sourced gamma rays are reduced, and the detrimental effects of removing too much of the good data are also reduced.

Figure 5:
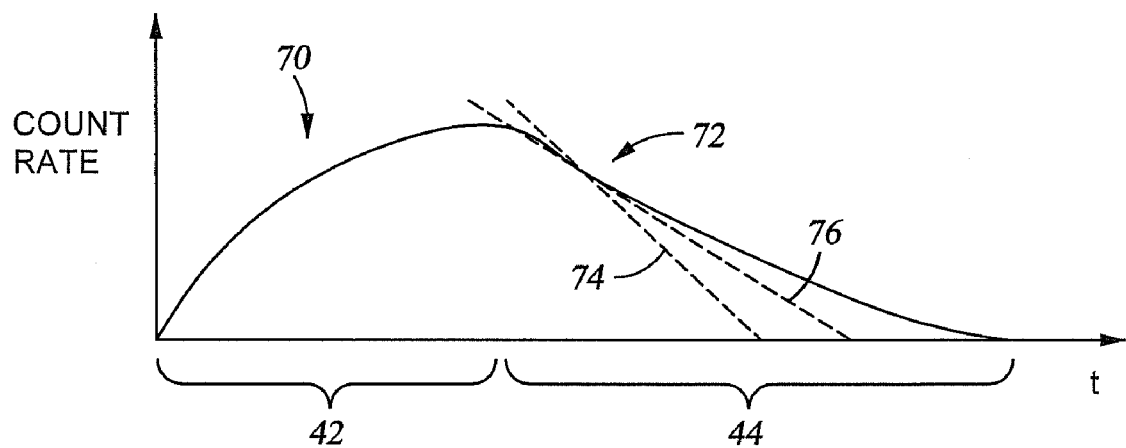
FIG. 5 illustrates a graph of gamma ray count rate as a function time in accordance with embodiments of the invention.

Embodiments of the invention may also calculate macroscopic capture cross-section. Calculation of this formation parameter is discussed with respect to FIG. 5. FIG. 5 illustrate a graph having time as the abscissa, and capture gamma ray count rate (independent of energy) as the ordinate, over the course of an illustrative burst time 42 and decay time 44. The portion of the curve 70 just after transition from the burst time 42 to the decay time 44 has an exponential decay, and the time constant for this decay (which is alternatively referred to as the initial slope) is inversely proportional to a parameter known as the macroscopic capture cross-section. However, for a period of time after the end of the burst time 42, the capture gamma ray count rates are affected by borehole-sourced capture gamma rays. Thus, determining the macroscopic capture cross-section of the formation in accordance with some embodiments of the invention only utilize counts of the capture gamma rays after the point in time at which arrival of gamma rays produced within the borehole have substantially ceased. This point in time could be, for example, all counts after the illustrative line 72. In this way, the detrimental effects of borehole-sourced capture gamma rays are reduced, and the detrimental effects of removing too much of the good data are also reduced. As an example, line 74 illustrates the initial slope if the macroscopic capture cross-section is calculated before the illustrative line 72, and line 76 represents the initial slope of the line at illustrative line 72. Thus, it is seen that calculating the macroscopic capture cross-section with data before the borehole contribution has died out (or too long after for that matter), significantly affects the calculated macroscopic capture cross-section.

The various embodiments discussed to this point have assumed that the borehole-sourced capture gamma ray count rates will be initially higher than the formation. However, there are situations where precisely the opposite is true: the formation-sourced capture gamma ray count rates are initially higher than the borehole-sourced gamma ray count rates. Stated otherwise, the borehole neutrons may, in some situations, decay more slowly than the formation neutrons. Using techniques of the various embodiments discussed above, the formation-sourced capture gamma rays can be distinguished from the borehole-sourced capture gamma rays by determining when the borehole-sourced capture gamma rays become statistically significant. From the formation-sourced capture gamma rays parameters of interest of the formation may be determined.

Figure 6:
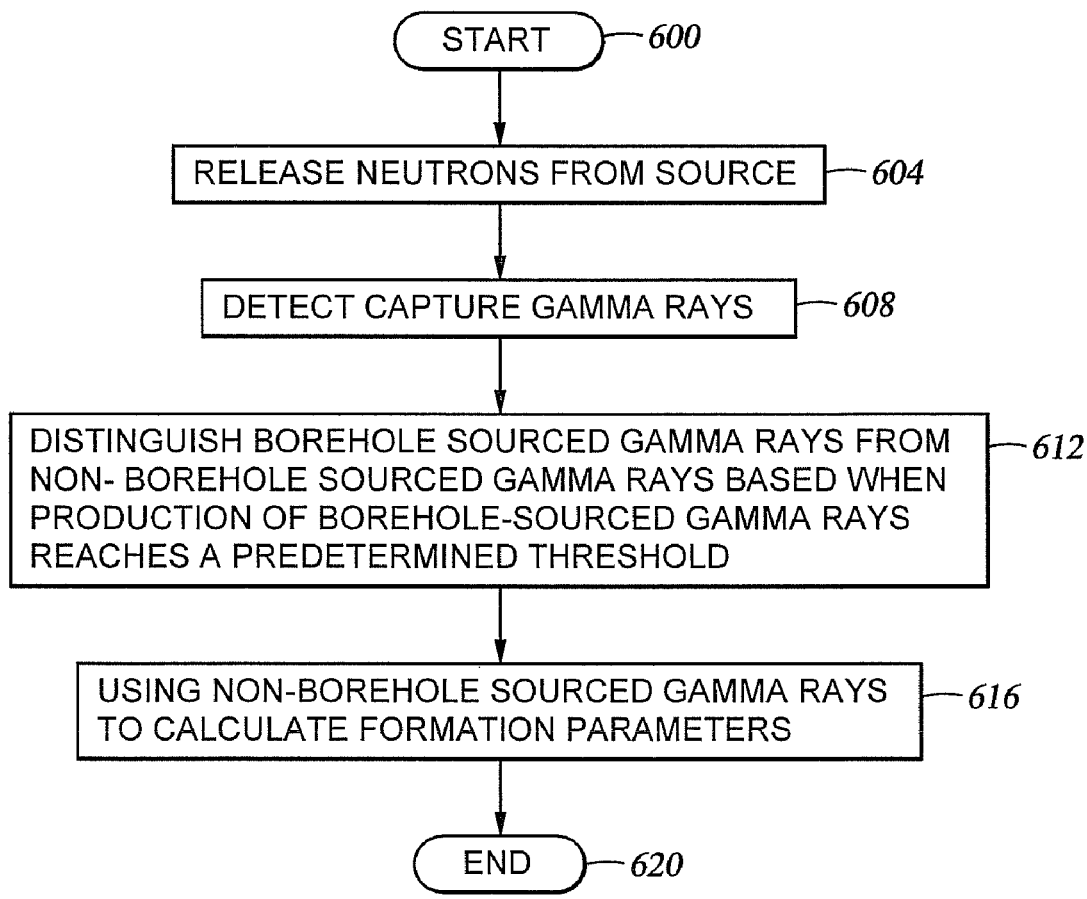
FIG. 6 illustrates a method in accordance with embodiments of the invention.

FIG. 6 illustrates a method in accordance with embodiments of the invention. In particular, the method starts (block 600) and moves to releasing neutrons from a neutron source (block 604), such as a neutron source of a logging tool within a cased or uncased borehole. Next, capture gamma rays are detected (block 608). Thereafter, borehole-sourced capture gamma rays are distinguished from non-borehole-sourced capture gamma rays based on when production of borehole-sourced capture gamma rays reaches a predetermined threshold (block 612). In situations where the borehole-sourced capture gammas are predominant during and just after the burst time, the predetermined threshold may be when the borehole-sourced capture gamma rays substantially cease. In situations where the non-borehole-sourced capture gamma rays (formation-sourced) are predominant during and just after the burst time, the predetermined threshold may be when production of the borehole-sourced capture gamma rays reaches a statistically significant number. Regardless of how distinguished, using non-borehole-sourced capture gamma rays formation parameters are calculated (block 616), such as formation lithograph and/or macroscopic capture cross-section. Thereafter, the illustrative process ends (block 620).

From the description provided herein, those skilled in the art are readily able to combine software created as described with appropriate general purpose or a special purpose processors to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   releasing neutrons from a neutron source of a logging tool within a borehole;
   detecting gamma rays by a sensor on the logging tool, the gamma rays produced by capture of at least some of the neutrons;
   distinguishing borehole-sourced gamma rays from formation-sourced gamma rays based on a point in time at which production of borehole-sourced gamma rays reaches a predetermined threshold; and
   using the formation-sourced gamma rays to determine a parameter of a formation surrounding the borehole.

2. The method as defined in claim 1 wherein distinguishing further comprises distinguishing based on the point in time when production of borehole-sourced gamma rays substantially ceases.

3. The method as defined in claim 1 wherein using further comprises determining, using the formation-sourced gamma rays, at least one selected from the group consisting of: at least a portion of formation lithography; and macroscopic capture cross-section.

4. The method as defined in claim 1 wherein distinguishing further comprises distinguishing based on the point in time at which the production of gamma rays attributable to capture reaches the predetermined threshold by at least one selected from the group consisting of: iron; hydrogen; and chlorine.

5. The method as defined in claim 1 further comprising:
   wherein detecting further comprises detecting arrival time and energy of the gamma rays in a plurality of sequential time bins; and wherein determining further comprises:
   analyzing one or more energy bands across a plurality of the sequential time bins; and
   selecting the point in time based on when arrivals of gamma rays of a particular energy band reach the predetermined threshold.

6. The method as defined in claim 5 wherein selecting further comprises selecting the point in time based on when arrivals of gamma rays of a particular energy band at least one selected from the group consisting of: substantially cease; and reach statistically significant levels.

7. The method as defined in claim 1 wherein releasing neutrons further comprises releasing neutrons from a neutron source being at least one selected from the group consisting of: a wireline logging tool; and a logging while drilling tool.

8. A logging tool comprising:
   a tool body;
   a neutron source coupled within the tool body, the neutron source releases neutrons in bursts;
   a gamma ray detector coupled within the tool body, the gamma ray detector senses energy of gamma rays produced by capture of at least some of the neutrons;
   a processor electrically coupled to the neutron source and the gamma ray detector;
   the processor identifies gamma rays produced by the formation based on the point in time at which gamma rays produced within the borehole reach a predetermined threshold, and the processor determines at least one selected from the group consisting of: at least a portion of formation lithography; and macroscopic capture cross-section of the formation.

9. The logging tool as defined in claim 8 wherein the processor determines the point in time to be when gamma rays produced within the borehole substantially cease.

10. The logging tool as defined in claim 8 wherein the processor determines the point in time to be when gamma rays produced within the borehole reach statistically significant levels.

11. The logging tool as defined in claim 8 wherein the processor determines the point in time to be when gamma rays produced by neutron capture reach the predetermined threshold by at least one selected from the group consisting of: iron; hydrogen; and chlorine.

12. The logging tool as defined in claim 8 further comprising:
    wherein the processor records arrival time and energy of the gamma rays sensed by the gamma ray detector in a plurality of sequential time bins; and
    wherein the processor determines the point in time to be when arrival of gamma rays of a particular energy band reach the predetermined threshold.

13. The logging tool as defined in claim 8 wherein the tool body further comprises at least one selected from the group consisting of: a logging-while-drilling tool body; and a wireline tool body.

14. A computer-readable media storing a program that, when executed by a processor, causes the processor to:
    command release of neutrons from a logging tool within a borehole;
    determine from time of arrival and energy of a plurality of gamma rays generated by neutron capture when a borehole contribution of produced gamma rays substantially ceases; and
    calculate a parameter of a formation surrounding the borehole using gamma rays whose arrival time is after the borehole contribution of produced gamma rays substantially ceases.

15. The computer-readable media as defined in claim 14 wherein when the processor calculates, the program causes the processor to calculate at least a portion of the lithography of the formation surrounding the borehole.

16. The computer-readable media as defined in claim 14 wherein when the processor calculates, the programs causes the processor to calculate the macroscopic capture cross-section of the formation surrounding the borehole.

17. The computer-readable media as defined in claim 14 wherein when the processor determines, the program causes the processor to determine when gamma rays produced by neutron capture by iron substantially ceases.

18. The computer readable media as defined in claim 14 wherein when the processor commands, the program causes the processor to command across a wireline.

19. The computer readable media as defined in claim 14 wherein when the processor determines and calculates, the program causes the processor to determine and calculate in a surface computer.

20. The computer readable media as defined in claim 14 wherein when the processor determines and calculates, the program causes the processor to determine and calculate within the logging tool.

* * * * *